US00RE34413E

United States Patent [19]

McCullough

[11] E Patent Number: Re. 34,413

[45] Reissued Date of Patent: Oct. 19, 1993

[54] SYNCHRONIZER AND UNLOADING SYSTEM FOR SCROLL FLUID DEVICE

[75] Inventor: John E. McCullough, Carlisle, Mass.

[73] Assignee: Arthur D. Little, Inc., Cambridge, Mass.

[21] Appl. No.: 886,807

[22] Filed: May 22, 1992

Related U.S. Patent Documents

Reissue of:

[64] Patent No.: 4,927,340
Issued: May 22, 1990
Appl. No.: 234,098
Filed: Aug. 19, 1988

[51] Int. Cl.[5] ..... F01C 1/04; F16D 3/04

[52] U.S. Cl. ..... 418/55.3; 418/55.5; 418/57; 464/102

[58] Field of Search ..... 418/14, 55.3, 55.5, 418/57, 188; 464/102, 106, 157, 160; 74/63

[56] References Cited

U.S. PATENT DOCUMENTS

| | | | |
|---|---|---|---|
| 3,247,734 | 4/1966 | Africano et al. | 464/160 |
| 3,600,114 | 8/1971 | Dvorak et al. | 418/57 |
| 3,817,664 | 6/1974 | Bennett et al. | 418/57 |
| 3,874,827 | 4/1975 | Young | 418/57 |
| 3,884,599 | 5/1975 | Young et al. | 418/55.5 |
| 3,994,635 | 11/1976 | McCullough | 418/55.2 |
| 4,178,143 | 12/1979 | Thelen et al. | 418/57 |
| 4,457,675 | 7/1984 | Inagaki et al. | 418/57 |
| 4,610,610 | 9/1986 | Blain | 418/57 |
| 4,795,323 | 1/1989 | Lessie | 418/55.3 |

*Primary Examiner*—John J. Vrablik
*Attorney, Agent, or Firm*—Bacon & Thomas

[57] ABSTRACT

A scroll fluid device is provided with a synchronizer arrangement that prevents relative rotation between the involute scroll wraps defining fluid working chambers while permitting the wraps to orbit relative to each other to perform work on fluid moved through the device or to expend work through the reaction of fluid moving through the device. The synchronizer comprises axially extending teeth affixed to one of the scroll support end plates interdigited with grooves affixed to the other end plate. The grooves of the synchronizer each have a width that accommodates the orbital excursion of each tooth extending into the groove such that, during orbital movement of one scroll wrap relative to the other, the teeth engage the side walls of the groove to prevent rotation of the scroll wraps relative to each other in either direction. The synchronizer also permits movement of one scroll wrap relative to the other along a line generally extending between the involute centers of the wraps in a direction that reduces the orbit radius.

10 Claims, 3 Drawing Sheets

SYNCHRONIZER AND UNLOADING SYSTEM FOR SCROLL FLUID DEVICE

Matter enclosed in heavy brackets [ ] appears in the original patent but forms no part of this reissue specification; matter printed in italics indicates the additions made by reissue.

FIELD OF THE INVENTION

This invention relates to scroll fluid devices, such as, for example, pumps, compressors, motors and expanders.

BACKGROUND OF THE INVENTION

The generic term "scroll fluid device" is applied to the well-known arrangement of meshed, involute spiral wraps that are moved along curvilinear translation paths in orbiting fashion relative to each other to produce one or more fluid transporting or working chambers that move radially between inlet and outlet zones of the device. Such scroll devices may function as pumps, compressors, motors or expanders, depending upon their configuration, the drive system utilized and the nature of energy transferred between the scroll wraps and the fluid moving through the device.

Scroll devices, including their principle of operation, are fully described by way of example in U.S. Pat. Nos. 3,874,827 to Niels O. Yound; 3,560,119 to Busch et al.; and 4,141,677 to Weaver et al. The descriptions contained in the aforementioned patents, to the extent that they generally describe the theory of operation and typical structural arrangements of scroll fluid devices are herein incorporated by reference.

Scroll devices utilizing co-rotating scroll wraps are also generally known and provide certain advantages over scroll device utilizing a single orbiting scroll wrap and an opposed, cooperating fixed scroll wrap. In co-rotating scroll fluid devices, both scrolls rotate about laterally displaced parallel axes but are confined to relative orbital motion between themselves by means of suitable couplings, sometimes referred to as Oldham couplings. Oldham couplings are used in all types of scroll devices to prevent relative rotation between the meshed scroll wraps while permitting their relative orbital movement with respect to each other.

Co-rotating scroll devices provide the advantage that they can generally operate at a higher speed than single orbiting scrolls to minimize size and maximum operating efficiency. A typical example of a co-rotating scroll fluid device is illustrated in U.S. Pat. No. 4,178,143 to Thelen et al. In this example, a conventional Oldham coupling is used between the co-rotating scrolls to maintain them in fixed rotational relationship while permitting their relative orbital movement with respect to each other. A single driveshaft transmitting torque to one scroll wrap is illustrated, but it is also well known that both scroll wraps can be driven simultaneously in rotation.

Co-rotating scroll fluid devices known in the prior art and which provide an arrangement for unloading the sealing force between the flanks of the wraps are exemplified in U.S. Pat. No. 4,610,610 to Blain. Movement of one wrap of a co-rotating scroll fluid device relative to the other wrap to adjust the distance between the axes of the wraps while the device is operational is also suggested in the above-mentioned U.S. Pat. No. 4,178,143 to Thelen et al. Exemplary prior art describing lateral movement of the orbit center of a single orbiting wrap relative to a fixed wrap in a scroll fluid device is seen in U.S. Pat. No. 3,994,635 of McCullough, wherein a compliant drive system for the orbiting scroll is described. U.S. Pat. No. 4,795,323 issued Jan. 3, 1989 to Lessie illustrates an Oldham coupling comprising cooperating pins and circular grooves.

In a co-rotating as well as orbital scroll fluid device, a problem is encountered in the typical sliding ring-type Oldham coupling in that the sliding ring is subject to wear, vibration and adverse effects due to friction loading. Lubrication is usually required due to the friction between the sliding surfaces of the ring and high speed operation of a scroll fluid device may be limited by disturbances present between the sliding surfaces of this type of Oldham coupling.

BRIEF SUMMARY OF THE INVENTION

The present invention provides a unique synchronizer for scroll fluid devices wherein the conventional sliding ring element is eliminated and the anti-rotation function is provided by means of interdigited teeth and grooves affixed to the supporting end plates of the scroll wraps. The teeth and grooves are fixed to the end plates so that they move with the latter, thereby accommodating relative orbital movement between the scroll wraps, while preventing relative rotation between the wraps.

In accordance with the present invention, the synchronizer comprises an annular array of circumferentially spaced teeth axially extending from and affixed to the support plate of one wrap, and cooperating with axially extending grooves affixed to the other wrap support plate with which the teeth are interdigited. The grooves are of a width to accommodate the maximum orbital excursion of the teeth side walls relative to the grooves and are arranged such that, when the teeth and grooves are interdigited, relative angular displacement of one wrap relative to the other is prevented while the orbital movement of one wrap relative to the other is accommodated.

Any desired number of teeth and grooves can be provided, so long as the relationship is maintained that the width of the grooves substantially just accommodates the orbital movement of the teeth during operation of the co-rotating scroll fluid device. In a typical example, the width of the groove would be three times the orbit radius of the scroll wraps, while the width of the teeth would correspond to the orbit radius. Upon proper meshing of the scroll wraps and the teeth within the grooves, relative rotation between the scroll wraps cannot occur while the full relative orbital motion between the wraps is accommodated.

A suitable arrangement is provided to permit lateral movement of one scroll wrap relative to the other, for example, by adjustably supporting the bearing of the support shaft of one scroll wrap in such a manner that the one scroll wrap can move in a direction tending to close the distance between the orbit centers or the axes of rotation. In this manner, a scroll fluid device configured like a compressor or pump can be unloaded at startup or in the presence of a slug of liquid by separating the scroll wraps from each other to relieve the sealing force between them. The synchronizer coupling in accordance with the present invention accommodates the lateral movement of a scroll wrap relative to the other without the need for utilizing a sliding ring-type synchronizer as is typically used in the prior art.

BRIEF DESCRIPTION OF THE FIGURES

With reference to the accompanying illustrations which depict schematically preferred embodiments of the invention.

DETAILED DESCRIPTION OF PREFERRED EMBODIMENTS

Figure 1:
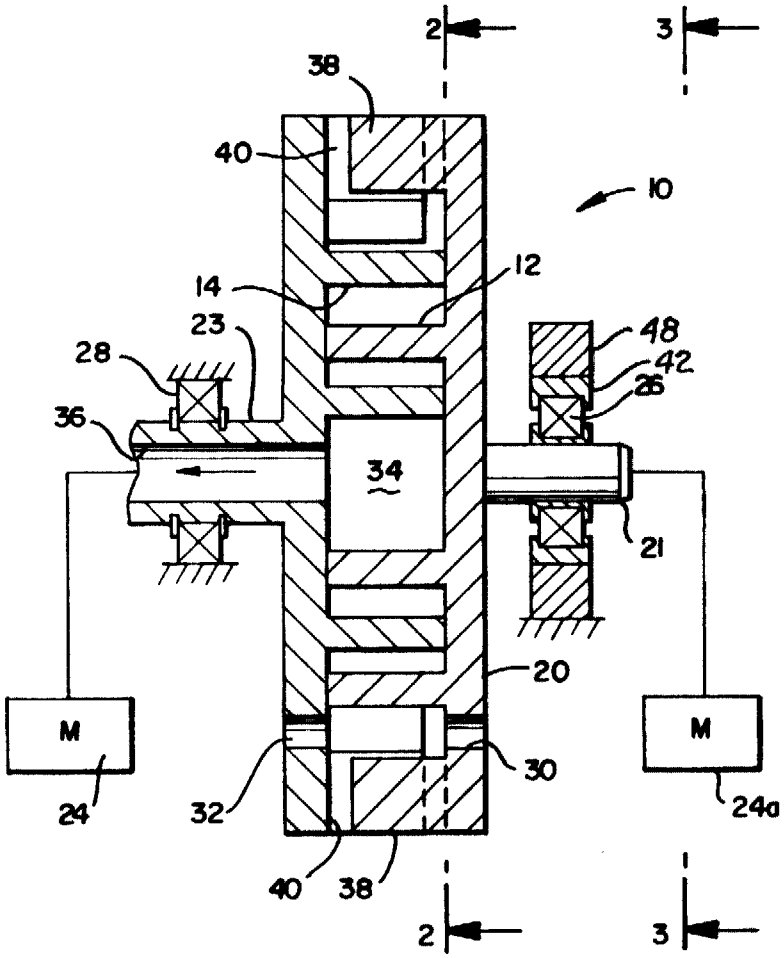
FIG. 1 is a section view taken essentially longitudinally through a co-rotating scroll fluid device embodying the present invention.
Figure 2:
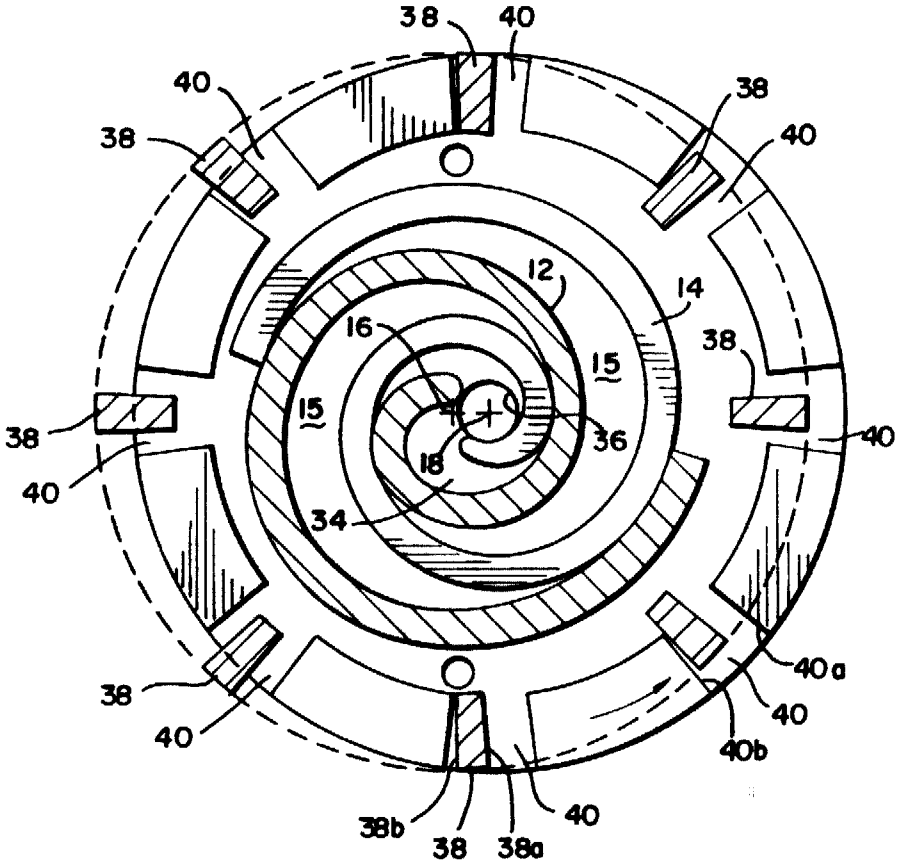
FIG. 2 is a view taken essentially along line 2—2 of FIG. 1.

With reference to the accompanying drawings, FIGS. 1 and 2 schematically represent a scroll fluid device 10 including a pair of meshed involute spiral wraps 12,14 defining trapped fluid or working chambers 15, having involute centers 16,18, respectively, separated by a distance corresponding to an orbit radius defining an orbital excursion of one scroll wrap relative to the other. The wraps 12,14 are supported by wrap support plates 20,22. Wrap support plate 20 is supported for rotation by a spindle or shaft 21 and wrap support plate 22 is supported by shaft 23. The wrap support plates are mounted such that they maintain their axial relationship while they rotate with respect to fixed structure. This type of scroll configuration and its principle of operation is well known in the field of scroll fluid devices generally.

The scroll wrap support plates 22,20 in this embodiment are respectively mounted for co-rotation together about parallel axes of rotation extending through the involute centers 16,18. Suitable energy sources such as motors 24,24a drive the wrap support plates 20,22, respectively, in rotation about their axes of rotation which are parallel to each other and coincide with the involute centers 16,18. While two motors are illustrated in this embodiment, it will be understood that a single motor could be utilized in accordance with known principles to drive one of the scroll support plates while the other support plate is driven either through the meshed scroll wraps or through the synchronizer coupler. Upon co-rotation of the scroll wraps about their respective axes of rotation, it is clearly evident that the scroll wraps both spin while they participate in orbital movement relative to each other, wherein the orbital radius is the distance between the involute centers 16,18 which correspond to the axes of rotation of the scroll wraps and their respective support plates.

The wraps support plates 20,22 are supported for rotation about their axes of rotation by means of appropriate bearing supports 26,28 which engage the shafts 21,23. The bearings may assume any appropriate form suitable for the operating conditions of the scroll fluid device. However, one of the support bearings 26 is arranged so that its respective wrap support plate 20 is movable relative to the other wrap support plate 22 in a direction generally along a line connecting the involute centers 16,18 in a direction that reduces the distance between the invention centers. This will be described in more detail below.

The scroll fluid device illustrated in FIGS. 1 and 2 typically would operate at high speed within a gaseous fluid medium surrounding the rotating scroll wraps so that, when the device is operated as a compressor, the fluid intake occurs at the peripheral area of the wraps and appropriate inlet ports 30,32 can be provided to insure an adequate supply of intake fluid into the pumping chambers between the wraps during operation of the device. The outlet zone of the device, when functioning as a compressor, is at the central area 34 between the wraps and an outlet port 36 is provided for the fluid pumped by the scroll device during operation of the system.

Of course, as is well understood in this field of technology, the scroll fluid device illustrated can operate as an expander by admitting pressurized fluid at port 36 into zone 34 and causing its expansion in the general direction of ports 30 and the peripheral region of the scroll wraps. For purposes of this description, it will be assumed that the scroll fluid device illustrated is arranged to function as a compressor.

The synchronizer arrangement in accordance with this invention comprises an annular array of axially projecting radially and circumferentially extending teeth 38 affixed to and extending from wrap support plate 20 toward the opposite wrap support plate 22, the teeth being interdigited with corresponding axially extending grooves 40 provided on the opposite wrap support plate 22, each of the grooves 40 having a width that accommodates orbital movement of the teeth 38. The teeth 38 have generally radially extending, circumferentially spaced flat side wall surfaces 38a and 38b. The grooves 40 likewise are defined by radially extending and circumferentially spaced flat side wall surfaces 40a and 40b. Both teeth 38 and groove side walls 40a,40b are integral with and extend from the support plates 20,22. Thus, for illustrative purposes, assuming an orbit radius of 0.6 cm., and teeth sidewall surfaces 38a,38b separated by a width also of 0.6 cm., the width between the groove sidewall surfaces 40a,40b would be 1.8 cm. (triple the orbit radius). That is, the grooves 40 precisely accommodate the maximum orbital excursion of the teeth 38 such that, as illustrated in FIG. 2, relative rotation between the wrap support plates 20,22 is effectively prevented due to the interfitting relationships between the teeth 38 and grooves 40.

It will be noted from observing FIG. 2, that if the involute centers 16,18 coincided, each tooth 38 would lie in the center of each groove 40. Then, as the involute centers 16,18 are separated from each other up to the orbit radius when the scroll flanks contact each other, at least two side surfaces of opposed teeth 38 approach and contact at least two opposed sidewall surfaces of a groove 40 to prevent relative rotation between the scroll wraps in either direction. However, orbital movement of each tooth 38 within each groove 40 is fully accommodated even though the grooves are laterally displaced relative to the teeth, all as is clearly illustrated in FIG. 2.

The clearance between the flanks of the scroll wraps is generally predetermined for any scroll fluid device to control friction between scroll flanks and to increase longevity of the scroll fluid device. Moreover, in a scroll fluid device operating without lubrication, such as a high speed gaseous compressor, small clearances must be maintained between the scroll flanks to avoid friction and wear. Scroll flank clearance is maintained by controlling the orbit radius between the scroll wraps.

The synchronizer, according to the present invention, likewise can be operated with small clearances to avoid wear between the walls of the teeth and grooves. Provided that the clearances are small, particularly at high operating speeds, the synchronizer effectively maintains the scrolls in proper phase relationship without relative rotation between them. On the other hand, if it is desired to have flank-to-flank contact between the involute scroll wraps, the synchronizer must be configured such that the scroll wraps will contact each other just before the teeth sidewalls contact the groove sidewalls when the device is in operation. In any embodiment of the scroll fluid device utilizing the synchronizer in accordance with this invention, the particular contact point between teeth and grooves as well as the clearance between scroll wrap flanks will be controlled in accordance with the design parameters for the specific scroll fluid device. In all instances, the space between the groove side walls must accommodate the orbital excursion of the teeth, although slight clearances can be accommodated within the design parameters of any scroll fluid device constructed in accordance with this invention.

Figure 3:
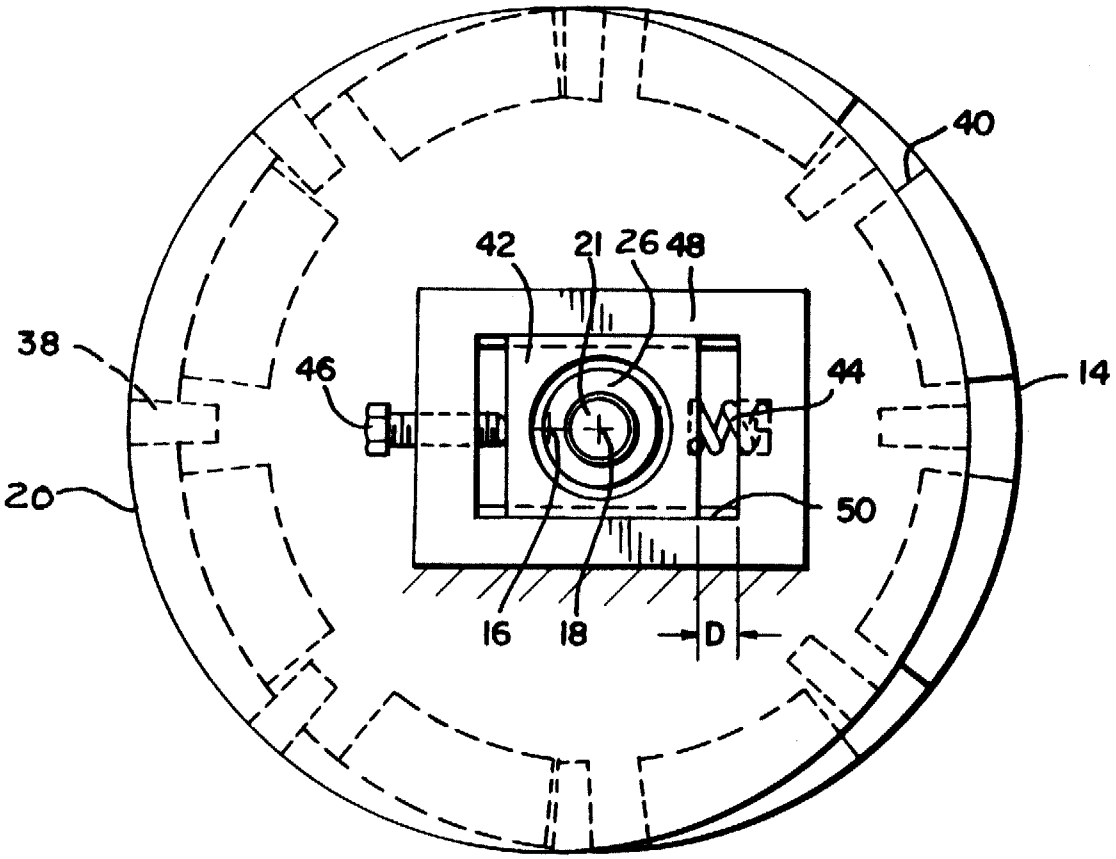
FIG. 3 is an end elevation view taken from the right side of FIG. 1.
Figure 2A:
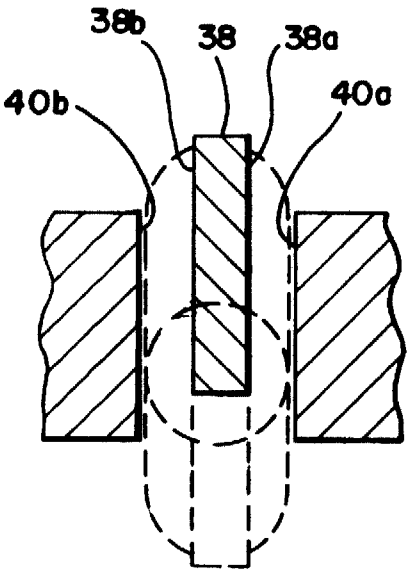
FIG. 2a is a detail view of an interdigited tooth and groove of the synchronizer in accordance with the invention.

The illustrated embodiment of the invention provides a scroll fluid device that normally pumps compressible fluid yet can accommodate occasional ingestion of an incompressible fluid without jamming or damaging the scroll device. For example, in refrigeration systems, a slug of liquid refrigerant occasionally can reach the scroll pump functioning as a compressor. The liquid is incompressible and would force stoppage of the pump or damage to the scroll device if the scroll wraps could not separate from each other to accommodate the slug of liquid. The present invention utilizes the synchronizer teeth 38 cooperating with the grooves 40 in combination with a bearing support means for one of the wrap support plates, in this case support plate 20, whereby the support plate 20 and its associated wrap 12 can move generally in a direction along a line joining the involute centers 16,18 in a direction tending to reduce the distance between these centers to thereby reduce the orbit radius between the wraps. The adjustable bearing support of FIG. 1 is illustrated in FIG. 3, wherein the bearing support 26 for wrap support plate 20 includes a slide 42 that is biased by a spring means 44 against an adjustable stop 46 such that the distance between involute centers 16,18 is maintained at a desired orbit radius for the specific scroll device. The adjustable stop 46 is illustrated for simplicity as a threaded member engaging the bearing support 48 which supports the bearing slide 42 for linear movement in a direction along a line connecting involute centers 16,18. The bearing support 48 supports slide 42 for movement in a direction toward the spring 44, for example, by means of a groove 50 in the support 48. Preferably, the support 48 and the track 50 only permit movement of the slide 42 and the bearing 26 a maximum distance D corresponding to the orbit radius between involute centers 16,18. It will be readily observed that, when the centers 16,18 overlie each other, no output is produced by rotation of the scroll wraps. Movement of the wraps beyond this distance also would create other mechanical and operational problems, so it is preferred that the movement of one scroll wrap relative to the other to reduce the orbit radius does not exceed the point at which the orbit radius is zero.

In operation, co-rotation of involute wraps 12,14 by motors 24,24a will cause pumping of fluid trapped in chamber 15 between the peripheral region of the wraps towards the central zone 34 and out the outlet port 36. The interdigited teeth 38 and grooves 40 maintain the wraps in their desired rotational relationship while accommodating lateral translation movement of wrap support plate 20 relative to support plate 22.

Upon the occurrence of a force between the meshed scroll wraps 12,14 tending to spread the wraps apart along their flanks, such as could occur upon ingestion of an incompressible fluid in chambers 15, the separation of the wraps will be accommodated by the bearing slide 42 which will permit wrap 12 and its support plate 20 to be displaced against the biasing force of spring 44 in a direction tending to close the orbit radius between involute centers 16,18. The spring 44 will tend to return the wraps to their normal position whereat the desired orbit radius is once again established with the wraps either engaging each other or in close proximity to each other with minimal clearance depending upon the desired operating parameters of the scroll fluid device.

It will be observed from FIG. 2 that lateral translation of wrap 12 relative to wrap 14 will cause teeth 38 to all translate linearly to the right in a direction parallel to a line joining the involute centers 16,18. This will cause some looseness in the synchronizer permitting limited relative rotation between the wraps momentarily until the desired orbit radius is once again established between the scroll wraps 12,14. By appropriate selection of the number of teeth 38 and grooves 40, this looseness can be minimized for any particular scroll fluid device.

It should be noted that the number of teeth 38 and grooves 40 shown in FIG. 2 is illustrative only and in actual practice considerably more teeth and grooves are provided for a more precise maintenance of the phase relationship between the scroll wraps 12,14.

Figure 5:
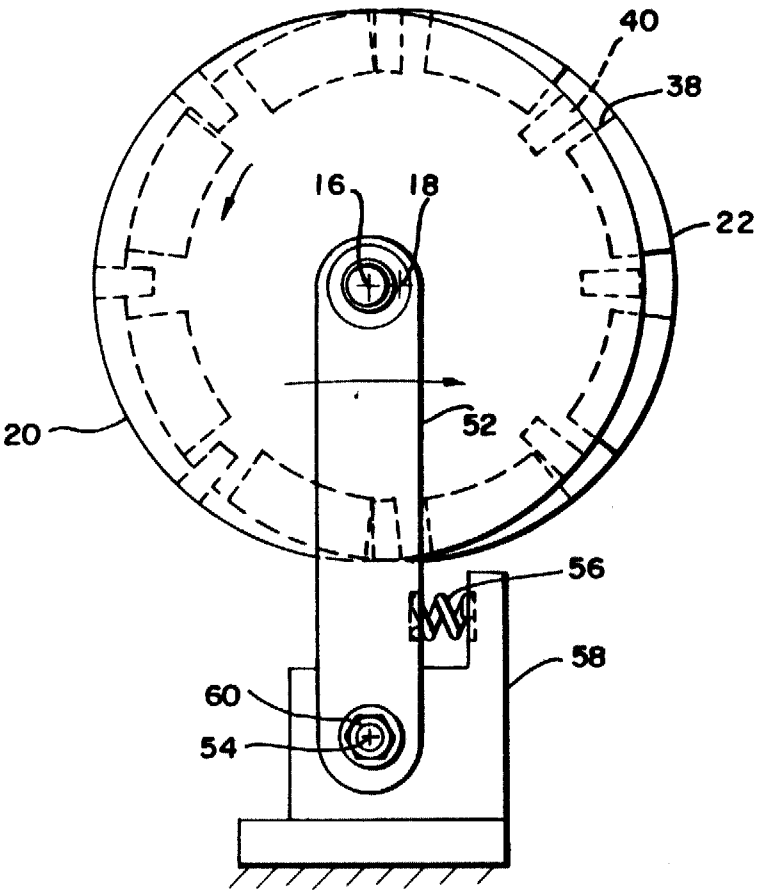
FIG. 5 is a view taken from the right side of FIG. 4.
Figure 4:
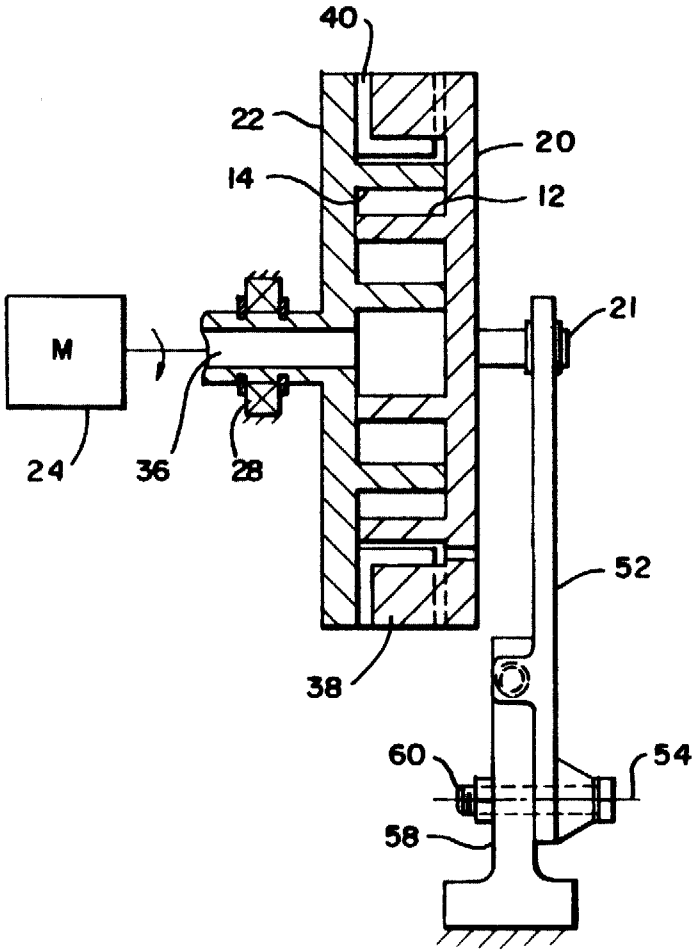
FIG. 4 illustrates an alternative embodiment of the invention.

In an alternate embodiment illustrated in FIGS. 4 and 5, where similar reference numerals designate similar structure, wrap support plate 20 is mounted for movement in a direction generally along a line connecting the involute centers 16,17 by means of an arcuate support arm 52 pivotable about a pivot axis 54 against the bias of a spring 56. The support arm 52 is shown mounted to fix the structure by a support plate 57 by means of a pivot shaft 60. In accordance with this embodiment, the movement of support plate 20 relative to plate 22 is arcuate instead of linear, but the movement of involute center 16 relative to involute center 18 essentially occurs along a line connecting the involute centers. The fact that the motion may deviate from a true line is inconsequential, provided that the synchronizer teeth 38 and grooves 40 can accommodate the motion without causing mechanical interference during operation of the fluid device.

It will be understood that the illustrated embodiment of the invention as described herein is illustrative only and it is not intended that the invention be limited to the configuration of the described embodiments. Rather, the scope of the invention is only intended to be limited by the full scope of the appended claims. In particular, it is to be noted that, while the invention has been described in connection with a co-rotating scroll fluid device, the synchronizer constructed in accordance with the present invention can also be used in an orbiting scroll device wherein one of the scroll wraps is driven orbitally relative to an opposed, fixed scroll wrap. Also, while the present invention has been described in connection with a high-speed, gaseous fluid compressor, the synchronizer could function in any environment, with or without lubrication, depending on whether the side surface of the teeth actually engage the side surfaces of the grooves of the synchronizer.

What is claimed is:

1. A scroll fluid device comprising, in combination:

at least one pair of meshed axially extending involute spiral wraps having involute centers and defining at least one chamber between them that moves radially between an inlet zone and an outlet zone when one wrap is orbited by translation along a curvilinear path about an orbit center relative to the other wrap;

wrap support means secured to and supporting each wrap;

means for mounting said wrap support means for enabling relative orbital motion of the wraps relative to each other about an orbit radius;

synchronizer means arranged to prevent relative rotation of one wrap relative to the other notwithstanding the orbital motion of one wrap relative to the other, said synchronizer being arranged to permit motion of one wrap relative to the other in a direction extending generally along a line connecting the involute centers of the wraps;

said wrap support means arranged so that one wrap support means is movable relative to the other wrap support means in a direction generally along a line connecting the involute centers of the wraps, said one wrap support means being located normally such that the distance between involute centers corresponds with a selected orbit radius of the scroll fluid device;

said synchronizer means comprising axially extending teeth integral with an projecting from one wrap support means and axially extending grooves provided in the other wrap support means, said teeth and grooves being interdigited;

said teeth comprising radially and circumferentially extending elements having flat circumferentially spaced teeth side wall surfaces, said grooves defined by generally radially extending flat groove side wall surfaces;

each of said teeth side wall surfaces being separated by a tooth width and each of said groove side wall surfaces being separated by a groove width, and wherein said groove width corresponds to the maximum orbital excursion of the teeth side wall surfaces, said teeth and groove side wall surfaces cooperating to prevent relative rotation between the scroll support means while accommodating their relative orbital motion.

2. The scroll fluid device as claimed in claim 1 wherein said scroll wraps are mounted for co-rotation with each other.

3. The scroll fluid device as claimed in claim 1, including means for applying a biasing force to said one wrap support means so that the involute centers are normally maintained apart a distance corresponding to a preselected orbit radius, said biasing means arranged to permit said movement of said one wrap support means relative to the other upon the occurrence of a force between the meshed wraps sufficient to overcome said biasing force and to separate the meshed wraps in a direction tending to reduce the orbit radius.

4. The scroll fluid device as claimed in claim 3, including adjustable stop means for limiting the maximum distance of separation between the involute centers of the scroll wraps.

*5. A scroll fluid device comprising, in combination:*

*at least one pair of meshed axially extending involute spiral wraps having involute centers and defining at least one chamber between them that moves radially between an inlet zone and an output zone when one wrap is orbited by translation along a curvilinear path about an orbit center relative to the other wrap;*

*wrap support means secured to and supporting each wrap;*

*means for mounting said wrap support means for enabling relative orbital motion of the wraps relative to each other about an orbit radius;*

*synchronizer means arranged to prevent relative rotation of one wrap relative to the other notwithstanding the orbital motion of one wrap relative to the other;*

*said synchronizer means comprising axially extending teeth associated with one wrap support means and axially extending grooves associated with the other wrap support means, said teeth and grooves being interdigited;*

*said teeth comprising radially and circumferentially extending elements having flat circumferentially spaced teeth side wall surfaces, said grooves defined by generally radially extending flat groove side wall surfaces;*

*each of said teeth side wall surfaces being separated by a tooth width and each of said groove side wall surfaces being separated by a groove width, and wherein said groove width corresponds to the maximum orbital excursion of the teeth side wall surfaces, said teeth and groove side wall surfaces cooperating to prevent relative rotation between the scroll support means while accommodating their relative orbital motion.*

*6. The scroll fluid device as claimed in claim 5 wherein said scroll wraps are mounted for co-rotation with each other.*

*7. The scroll fluid device as claimed in claim 5, wherein said synchronizer is arranged to permit motion of one wrap relative to the other in a direction extending generally along a line connecting the involute centers of the wraps, and said wrap support means are arranged so that the one wrap support means is movable relative to the other wrap support means in a direction generally along a line connecting the involute centers of the wraps, said one wrap support means being located normally such that the distance between involute centers corresponds with a selected orbit radius of the scroll fluid device.*

*8. The scroll fluid device as claimed in claim 7, including means for applying a biasing force to said one wrap support means so that the involute centers are normally maintained apart a distance corresponding to a preselected orbit radius, said biasing means arranged to permit said movement of said one wrap support means relative to the other upon the occurrence of a force between the meshed wraps sufficient to overcome said biasing force and to separate the meshed wraps in a direction tending to reduce the orbit radius.*

*9. The scroll fluid device as claimed in claim 8, including adjustable stop means for limiting the maximum distance of separation between the involute centers of the scroll wraps.*

*10. The scroll fluid device as claimed in claim 5, wherein said axially extending teeth are integral with and project from one wrap support means and said grooves are provided in the other wrap support means.*

* * * * *